United States Patent
Hollis et al.

(10) Patent No.: US 7,693,153 B2
(45) Date of Patent: Apr. 6, 2010

(54) DECOMPOSED SWITCHING NODE AND METHOD OF OPERATING THE SAME

(75) Inventors: Mark Hollis, Park Orchards (AU); Christian Groves, Newport (AU)

(73) Assignee: Telefonaktiebolaget L M Ericson (Pub), Stockholm (SE)

( * ) Notice: Subject to any disclaimer, the term of this patent is extended or adjusted under 35 U.S.C. 154(b) by 1148 days.

(21) Appl. No.: 10/488,497

(22) PCT Filed: Sep. 4, 2002

(86) PCT No.: PCT/EP02/10064

§ 371 (c)(1), (2), (4) Date: Nov. 15, 2004

(87) PCT Pub. No.: WO03/024052

PCT Pub. Date: Mar. 20, 2003

(65) Prior Publication Data

US 2005/0105495 A1    May 19, 2005

(30) Foreign Application Priority Data

Sep. 6, 2001    (AU) .................................. PR7540

(51) Int. Cl.
  H04L 12/56    (2006.01)
(52) U.S. Cl. ............... 370/395.3; 370/341; 370/342
(58) Field of Classification Search ............... 370/352, 370/401, 410, 341, 342, 395.3; 709/227; 455/450, 464

See application file for complete search history.

(56) References Cited

U.S. PATENT DOCUMENTS

| 6,011,969 | A  * | 1/2000 | Vargas et al. ................ 455/423 |
| 6,754,180 | B1 * | 6/2004 | Christie ....................... 370/236 |
| 6,885,658 | B1 * | 4/2005 | Ress et al. .................... 370/352 |
| 7,054,325 | B1 * | 5/2006 | Archibald .................... 370/410 |

(Continued)

OTHER PUBLICATIONS

Packages Guide Release 1 (Supplement to ITU-T Recommendation H.248, published Jun. 2001, p. 4 section 6.1.*

*Primary Examiner*—William Trost, IV
*Assistant Examiner*—Emmanuel Maglo

(57) ABSTRACT

In a telecommunications network, a method of controlling a media gateway to handle a multiplex session, using a media gateway controller, the media gateway and the media gateway controller communicating using a standardised interface protocol, e.g. H.248, providing for a set of command messages each of which contains: a context field for identifying a context of the media gateway; a termination field for identifying one or more terminations of the media gateway; at least one descriptor for defining properties of the context; and optionally a package identity and at least one associated property. The method comprises, at the media gateway controller, generating a command message said structure and containing a multiplex descriptor including a package identifier, the package identifier identifying a package implemented at the media gateway for handling a multiplex session, sending the generated command message from the media gateway controller to the media gateway, and, at the media gateway, establishing the context identified in the message according to the specified package. Preferably, the multiplex descriptor includes at least one property which is one of a circuit assignment map and a contiguous or non-contiguous service type.

13 Claims, 4 Drawing Sheets

U.S. PATENT DOCUMENTS

| | | | |
|---|---|---|---|
| 7,065,093 B1 * | 6/2006 | Kumar et al. | 370/401 |
| 7,092,493 B2 * | 8/2006 | Hou et al. | 379/35 |
| 7,113,992 B1 * | 9/2006 | Even | 709/227 |
| 7,245,589 B2 * | 7/2007 | Neulist et al. | 370/254 |
| 2003/0227908 A1 * | 12/2003 | Scoggins et al. | 370/352 |
| 2004/0213206 A1 * | 10/2004 | McCormack et al. | 370/352 |

* cited by examiner

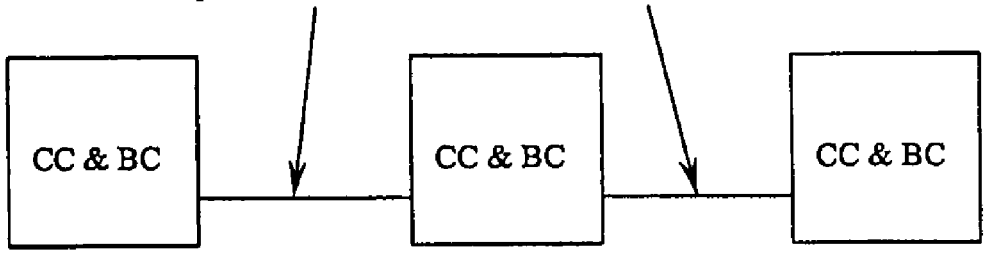

Current public networks' protocols (e.g. ISUP) perform simultaneous call and bearer control.

Figure 1a

CC protocol independent of the underlying transport (bearer) technology. Provides the current set of single media services available in today's public telecommunication networks

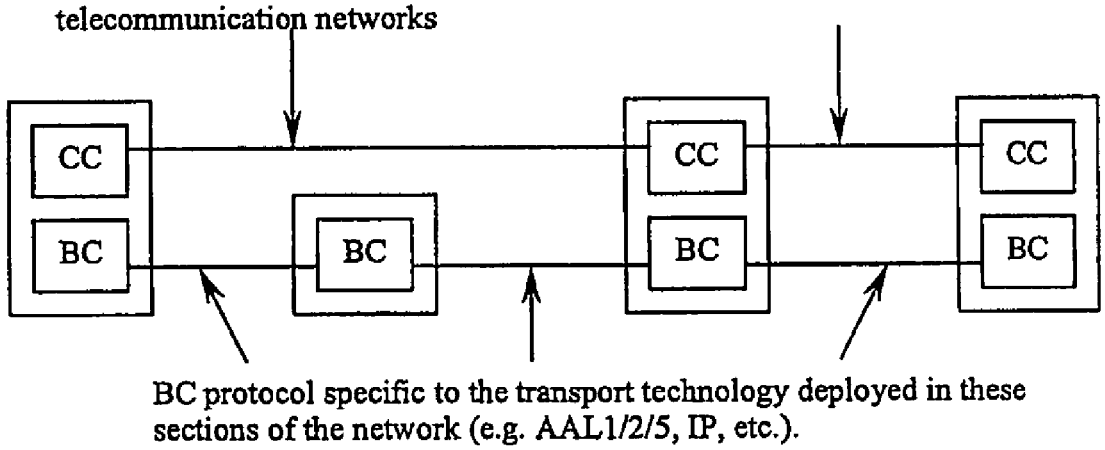

BC protocol specific to the transport technology deployed in these sections of the network (e.g. AAL1/2/5, IP, etc.).

Figure 1b

Context 1

DECOMPOSED SWITCHING NODE AND METHOD OF OPERATING THE SAME

FIELD OF THE INVENTION

The present invention relates to a decomposed switching node and a method of operating the same. More particularly, the present invention relates to a method of controlling a Media Gateway of a decomposed switching node to enable the Media Gateway to handle multiplexed calls.

BACKGROUND TO THE INVENTION

There exists considerable interest in using packet-based rather than circuit-based bearer transport mechanisms in telecommunications networks to carry user data, for example, voice traffic. The reasons for this are related both to improvements in efficiency as well as potential cost savings. Much consideration has been given for example to the use of Internet Protocol (IP) networks to transport user information between network nodes. IP networks have the advantage that they make efficient use of transmission resources by using packet switching and are relatively low in cost due to the widespread use of the technology (as opposed to specialised or proprietary communication technology). There is also interest in using other transport mechanisms including AAL1/2/5, FR etc.

The standard ISUP which deals with the setting-up and control of call connections in a telecommunications network is closely linked to circuit-based bearer transport mechanisms and does not readily lend itself to use with packet based transport technologies such as IP and AAL2. As such, several standardisation bodies including the ITU-T, ETSI, and ANSI, have considered the specification of a protocol for the control of calls, which is independent of the underlying transport mechanism. This can be viewed as separating out from the protocol, Bearer Control functions which relate merely to establishing the parameters (including the start and end points) of the "pipe" via which user plane data is transported between nodes, and which are specific to the bearer transport mechanism. The new protocol, referred to as Bearer Independent Call Control (BICC), retains Call Control functions such as the services invoked for a call between given calling and called parties (e.g. call forwarding), and the overall routing of user plane data. FIG. 1a illustrates the conventional integrated Call Control and Bearer Control structure of ISUP whilst FIG. 1b illustrates the proposed new separated structure. It is noted that at the junctions between different bearer networks, i.e. between different transport media, a gateway node is present which requires both the Call Control (CC) functions and Bearer Control (BC) functions. This node is referred to as a gateway node.

As a result of the CC/BC split, a new interface is exposed between the CC functions and BC functions. A protocol is required to enable coupling between the CC functions and BC functions when a node is implemented in a separated environment. One such interface protocol is the 'Media Gateway Control Protocol' (MGCP) whilst another, developed by IETF MEGACO group, is identified as H.248. According to H.248, the CC function is known as the 'Media Gateway Controller (MGC)' and the BC function is known as the 'Media Gateway (MG)'. The MGC and MG are sometimes referred to as the Call Serving Function (CSF) and Bearer Interworking Function (BIWF) respectively, with the MGC being responsible for call control signalling (e.g. ISUP, BICC, H.225, SIP, etc) and the MG being responsible for termination of the physical bearer(s) associated with a call's user plane data (e.g. TDM circuit, RTP stream, AAL2 channels, etc). Bearer Control such as Q.AAL2, IPBCP, and SDP may be implemented in either the MG or the MGC.

The need for the MGCP is illustrated in FIG. 2, which illustrates two peer gateway nodes which communicate with one another at both the CC level (MGC) and the BC level (MG). H.248 describes resources available at the bearer level in the MG (e.g. inputs, outputs, connectivity, call processing etc) in terms of "contexts" and "terminations". A context, identified by a context ID, is a logical concept embodied in a data structure stored at the BC and/or CC level which defines a connection within the BC functions using at least one termination. A termination represents a physical endpoint to which a bearer is physically or logically connected, and can be assigned one of a number of physical characteristics, for example transport type (Circuit, IP, ATM), media or codec type (GSM, G.711), or a priority level. FIG. 3 illustrates a simple context 1 having two terminations T1 and T2. This could represent, for example, a traditional telecommunications speech call between two parties where T1 represents the input port or incoming circuit for the calling party to the BC layer and T2 represents the output port or outgoing circuit for the called party from the BC layer.

WO01/49045 describes a telecommunications system in which a split exists between the call control and bearer control levels. This document is concerned in particular with the routing of call control related data from a traditional SS7 signalling network to a network having the split architecture.

ITU-T has developed a profile for the use of the core H.248 protocol, H.248.1, in BICC based networks. This is contained in recommendation Q.1950, "Bearer independent call bearer control protocol". That document effectively profiles H.248,1 and, indicates which extensions are to be supported. In depth procedures are documented for call related and non-call related scenarios and the document provides a linkage to the BICC procedures defined in Q.1902.4. For mobile networks, the 3GPP have also produced profile documentation for the use of H.248.1 across the Media Gateway Controller—Media Gateway interface. Technical Specification 29.232, "Media Gateway Controller (MGC)—Media Gateway (MGW) Interface; Stage 3", details this profile. TS 29.232 provides the same level of detail as Q.1950. The following discussion concerns modifications and additions to Q.1950 and TS 29.232 which will in turn result in the specification of new packages for H.248.

A decomposed switching (or gateway) node must support generic telecommunication services. In particular; a switching gateway must support multiplex connections where a number of circuits are multiplexed together, e.g. to provide a subscriber or other user with a high bandwidth connection, in particular to allow the high speed transmission of data, audio, and video. Such multiplexed connections are commonly used in today's ISUP-based circuit switched networks and the service is referred to as an N*64K service (where N identifies the number of (ISUP controlled) circuits multiplexed to form the connection and 64K is the data rate of a single circuit). FIG. 4 illustrates schematically the multiplexing of four 64K circuits to provide a connection with an effective bandwidth of 256K. Definitions of the N*64K service are given in:

ITU-T Recommendation Q.763 (12/1999), Signalling System No. 7—ISDN user parts formats and codes, and ITU-T Recommendation Q.764 (12/1999), Signalling System No. 7—ISDN user part signalling procedures.

In a N*64K connection, it is necessary for the Media Gateway to receive data from a set of "incoming" circuits in the correct order and to output that data on a set of "outgoing" circuits also in the correct order. The circuits on either side may be contiguous (i.e. consecutive), or may be non-contiguous. Moreover, the order of the circuits on the two sides may differ. For example, the circuit order on the incoming side may be CIC1, CIC2, CIC3, whilst on the outgoing side the order may be CIC1, CIC3, C!C2. The Media Gateway must generate, or obtain, a circuit assignment map in order to correctly handle multiplex connections.

A problem with implementing support for multiplex connections is that the necessary functionality must be distributed between the MGC and the MG. As communication between these two entities depends upon existing gateway control protocols, the scope and flexibility of the service depends upon the chosen protocol. The H.248 core protocol (H.248.1) specifies a command message structure, for messages sent from the MGC to the MG. An example command message for achieving a multiplex is as follows:

```
Message
Transaction
    {Context
    {Command [ADD]
        {Termination [TID=1]
        {Descriptors
            RemoteDescriptor,
            [Package/property=x,....]
            MultiplexDescriptor [Mux=....]
        }
        }
    }
    }
```

According to H.248.1 the type parameter (Mux) of the Multiplex Descriptor field is statically defined as one of the following enumerations; H.221, H.223, H.226, and V.76. By default, with H.248, all data arriving on each of the specified terminations of the specified context is output onto all of the other terminations, i.e. a fully meshed connection. This "conference" configuration is illustrated schematically in FIG. 5. Setting the Mux type parameter to a particular static type, e.g. H.221, will result in this behaviour being modified in that the data received on the terminations specified in the multiplex will be output to those not specified in the multiplex. However, for the N×64K service, data received from the multiplex must be output to the other terminations in a certain order. The multiplex descriptor of the current H.248 protocol does not allow this order to be indicated and thus the current H.248 cannot support the N*64K service.

SUMMARY OF THE INVENTION

The problem addressed by the present invention is that of providing for multiplex sessions within the restrictions imposed on OEMs and operators by the relevant Media Gateway control protocols, e.g. H.248.

The H.248.1 protocol allows for the effective extension of the protocol to cover new functionality and services. Users (e.g. OEMs, network operators, consortia, user groups etc) may deposit a detailed specification with the authority IANA (Internet Assigned Numbers Authority) controlling the H.248.1 protocol, the specification defining the functionality or service. The authority may themselves create such a specification. Assuming that the specification is accepted, it is referred to as a "package" and is given a unique package identity. As illustrated in the above command message structure, the command message includes a field for inclusion of one or more package identities. Packages are optionally implemented in Media Gateways so as to provide additional functionality and/or services. Other Media Gateway Control protocols may make use of similar protocol extensions which can also be referred to as "packages".

The command message structure allows for the inclusion of one or more properties for each package identity. These properties are used by the Media Gateway when implementing the identified package.

The inventors of the present invention have recognised that the problem of handling multiplex services at a decomposed switching node may be solved by specifying one or more appropriate packages, and by implementing these packages at the Media Gateway.

According to a first aspect of the present invention there is provided, in a telecommunications network, a method of controlling a media gateway to handle a multiplex session, using a media gateway controller, the media gateway and the media gateway controller communicating using an interface protocol providing for command messages having a structure containing:

a context field for identifying a context of the media gateway;

a termination field for identifying one or more terminations of the media gateway involved in said context;

at least one descriptor for defining properties of the context; and a package identity, at the media gateway controller, generating a command message having said structure and containing a multiplex descriptor including a package identifier, the package identifier identifying a package implemented at the media gateway for handling a multiplex session;

sending the generated command message from the media gateway controller to the media gateway; and at the media gateway, establishing the context identified in the message according to the specified package.

It will be appreciated that a Media Gateway Controller may generate a multiplex session related command message for any one of a number of different reasons. For example, the Media Gateway Controller may receive a connection setup request from a peer Media Gateway Controller at the Call Control level, which request identifies a multiplex session (the request may identify the incoming circuits involved in the multiplex session). Alternatively, a setup message may be received via a GSTN (e.g. PSTN or PLMN) to which the Media Gateway Controller is coupled.

It will also be appreciated that the interface protocol used to communicate between the media gateway and the media gateway controller will typically be a standardised interface protocol. However, minor changes may be made to that protocol depending upon the requirements of manufacturers and operators.

The term "establishing" as used here encompasses both the creation of a new context and the modification of an existing context.

Embodiments of the present invention provide a flexible means for implementing multiplex services at a decomposed switching node. If the invention is applied to H.248, a syntax change is required to the H.248.1 protocol to introduce packages into the multiplex descriptor. Thereafter, no modification to the existing interface control protocol is required to support the new multiplex functionality. Only one or more new packages need be specified with the protocol controlling authority. As a number of properties may be included in a command message for each identified package, a high level of control of the service can be maintained by the Media Gateway Controller.

The present invention is applicable in particular, though not necessarily, to the H.248 media gateway control protocol, and to enabling a N*64K service to be provided at a decomposed switching node.

According to a second aspect of the present invention there is provided a media gateway using an interface protocol providing for command messages having a structure containing:

a context field for identifying a context of the media gateway to which the message relates;

a termination field for identifying one or more terminations of the media gateway involved in said context;

at least one descriptor for defining properties of the context; and a package identity, processing means for generating a command message having said structure and containing a multiplex descriptor including a package identifier, the package identifier identifying a package implemented at a media gateway for handling a multiplex session;

input/output means for coupling to input/output means of a media gateway; and transmission means for sending the generated command message from the media gateway controller to a media gateway via the input/output means of the media gateway controller.

According to a third aspect of the present invention there is provided arranged in use to be controlled by a media gateway controller using an interface protocol providing for command messages having a structure containing:

a context field for identifying a context of the media gateway to which the message relates;

a termination field for identifying one or more terminations of the media gateway involved in said context;

at least one descriptor for defining properties of the context; and a package identity, processing and memory means for implementing at least one package;

input/output means for coupling to input/output means of a media gateway controller;

receiving means coupled to said input/output means of the media gateway for receiving a command message having said structure and containing a multiplex descriptor including a package identifier, the package identifier identifying a package implemented at a media gateway for handling a multiplex session, and for causing said processing and memory means to implement the identified package.

According to a fourth aspect of the present invention there is provided, in a telecommunications network, a method of controlling a media gateway to handle a multiplex session, using a media gateway controller, the media gateway and the media gateway controller communicating using the H.248 standardised interface protocol providing for command messages having a structure containing:

a context field for identifying a context of the media gateway;

a termination field for identifying one or more terminations of the media gateway; and at least one descriptor for defining properties of the context, at the media gateway controller, generating a command message having a multiplex descriptor including a static enumerator type N*64K;

sending the generated command message from the media gateway controller to the media gateway; and at the media gateway, responding to receipt of said message by implementing the N*64K package to create or modify a context.

BRIEF DESCRIPTION OF THE DRAWINGS

FIG. 1a shows in block diagram form the architecture of a conventional telecommunications network;

FIG. 1b shows in block diagram form a network architecture in which the Call Control protocol is independent of the transport mechanism;

DETAILED DESCRIPTION OF PREFERRED EMBODIMENTS

The following description of a preferred embodiment of the invention is concerned with the H.248 media gateway control protocol. However, it will be appreciated that the invention is also applicable to other media gateway control protocols which have features common to the H.248 protocol.

Figure 2:
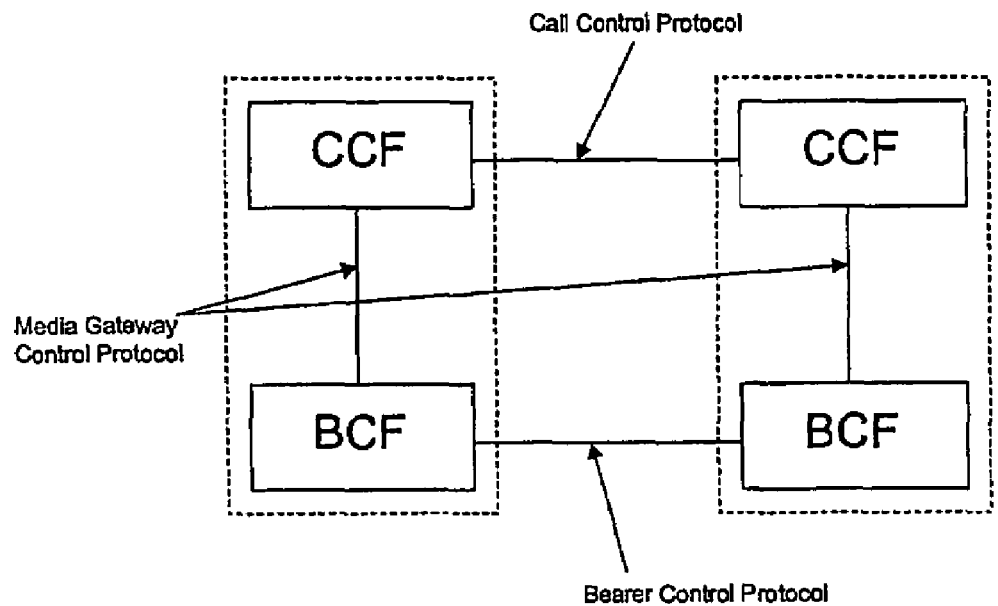
FIG. 2 illustrates the protocol layers at two peer gateway nodes which communicate with one another at both the CC level and the BC level.
Figure 3:
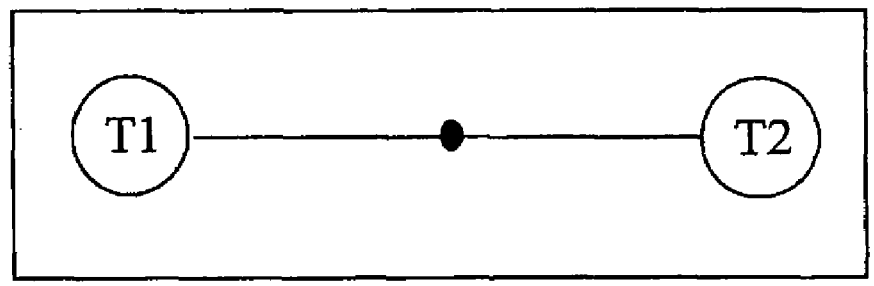
FIG. 3 illustrates schematically a simple context comprising two terminations.
Figure 4:
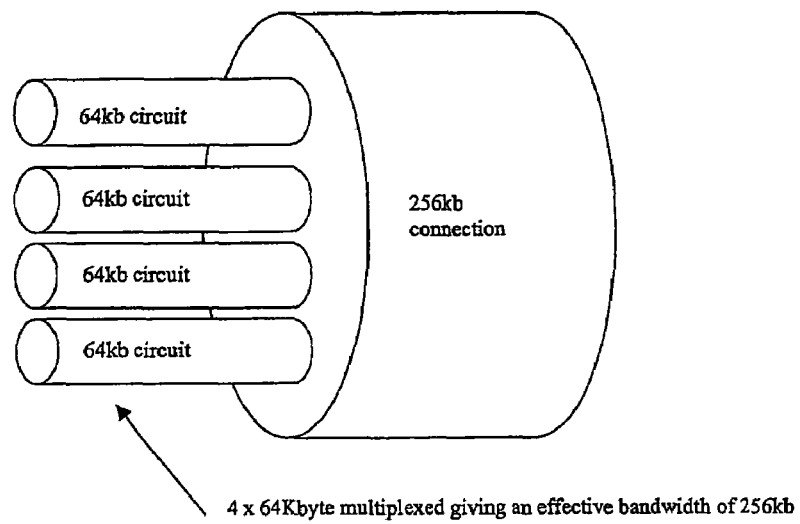
FIG. 4 illustrates schematically a N*64K multiplex service in which four 64K circuits are multiplexed to provide a single 256K high bandwidth connection.
Figure 5:
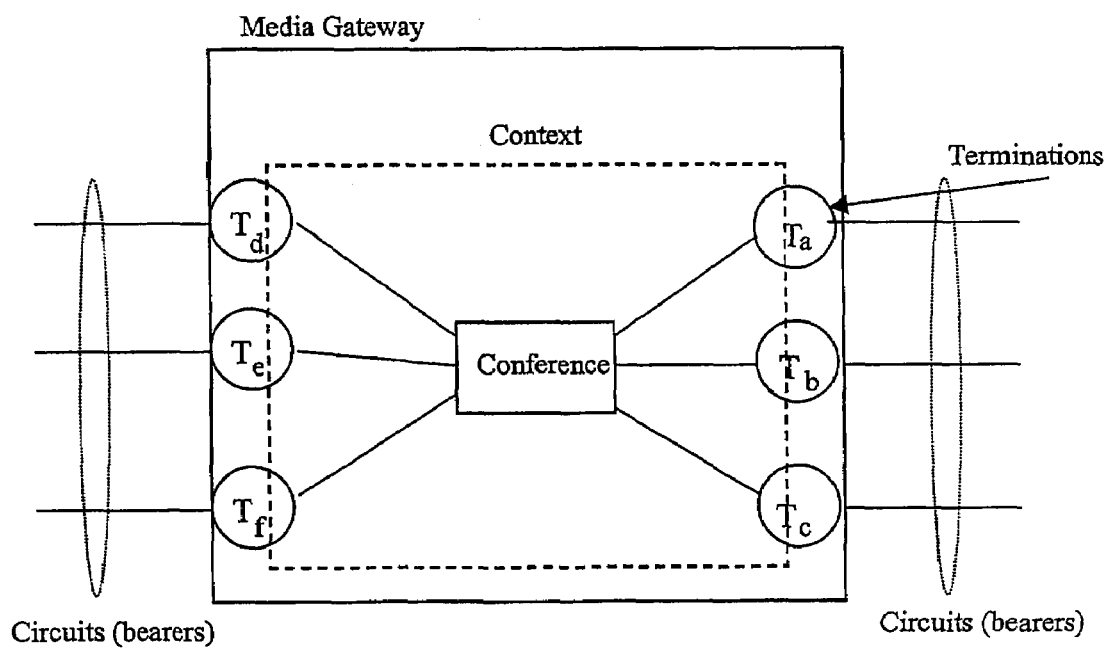
FIG. 5 illustrates schematically the default conference configuration resulting from addition of terminations to a context by a command message according to the H.246 protocol.
Figure 6:
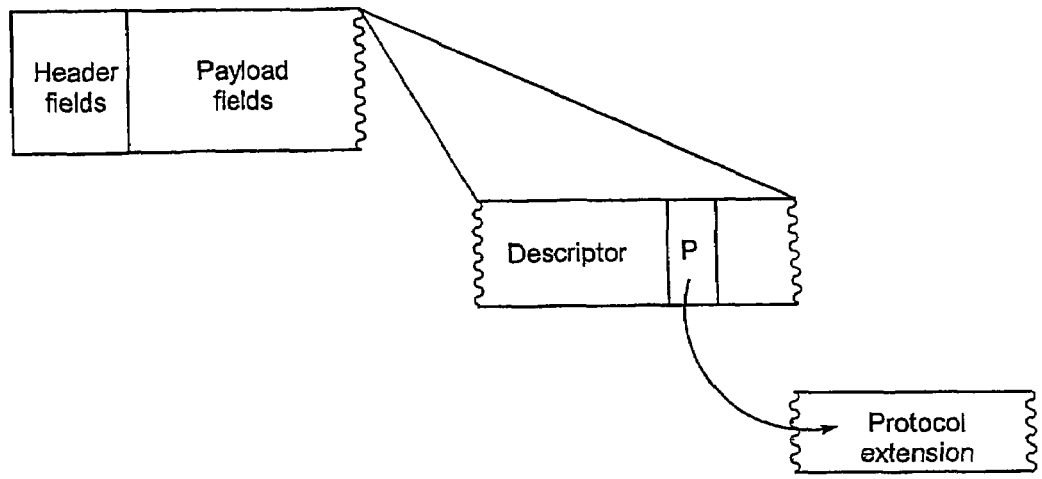
FIG. 6 illustrates, in exploded view, the structure of an H.248 command message.

With reference to FIG. 6, a command message according to the H.248.1 protocol comprises header fields, payload fields, a descriptor, and, optionally, a field which identifies a package and which contains one or more parameters of that package. As explained above, a package corresponds to a service or to functionality which is not specified in the core H.248.1 protocol, but which has been submitted to and accepted by the appropriate authority. The service or functionality is (optionally) implemented at a decomposed switching node, in the Media Gateway. A Media Gateway Controller can invoke the service or functionality by including the identity of the package in the appropriate command message field. An example package is the "Announcement package" H.248.7 which defines signals for allowing the Media Gateway Controller to request that the Media Gateway play announcements.

Figure 7:
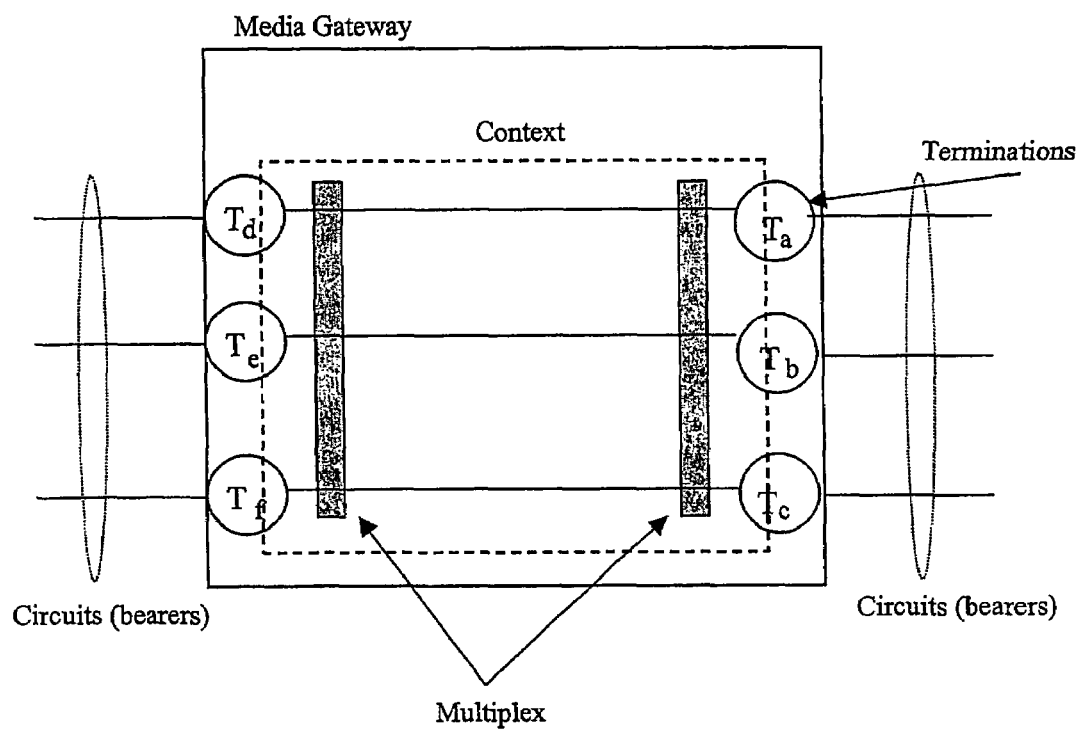
FIG. 7 illustrates schematically a context created in a Media Gateway to handle a multiplex connection.

"Type" is statically defined in the H.248 protocol as enumerations (H.221, H.223, H.226, V.76). FIG. 7 illustrates a N*64K service configuration in which terminations $T_a$, $T_b$, $T_c$ are connected to terminations $T_d$, $T_e$, $T_f$ respectively. In order to implement this N*64K service, the enumeration list can be updated in two ways:

1. A further (static) enumeration can be added that specifies type=N*64K.
2. A further enumeration can be defined as "other". This type points to a new package which implements the required multiplex service or function. The package identity is included within the multiplex descriptor. The descriptor would have the following structure: MuxDescriptor (type, [termination 1, termination 2, termination 3, . . . ], package mux type). For the specific example of the N*64K service: MuxDescriptor (other, [termination1, termination2], N*64K).

Implementation of option 1. will require an update to the syntax of H.248. Implementation of option 2. will also require a syntax update. However, with option 2., once the update is made further multiplex services can be added by introducing new packages. There is no need for further syntax updates for each service.

By itself, option 2. is restrictive as the properties of the N*64K service are static, and the multiplex descriptor does not allow for the specification of parameters to further define the characteristics of a multiplex. Greater flexibility can be introduced by adding additional fields to the multiplex descriptor to allow for the specification of N*64K service properties. The use of properties would result in the following command message structure:

MuxDescriptor (type, [termination1, termination 2, termination 3, . . . ], package mux type, [mux_property1, mux_property2, mux_property3, . . . )

For example:

MuxDescriptor(other, [termination1, termination2], N*64K, [N*64Ktype=contiguous, Circuit Assignment Map=00101000).

In order to implement option 2. extended by the use of properties, the following additions to existing standards/recommendations are proposed, where the BIWF is analogous to the Media Gateway and the CSF is analogous to the Media Gateway Controller. A "?" symbol represents a wildcard identifier, yet to be defined in the given protocol or standard. It is noted that the text is set out (formatted, headed, etc) according to the requirements of the various protocols, and is intended to be read in conjunction with these protocols.

(A) Additions to ITU-T Recommendation Q1950 (07/2001) for N*64K

The following objects are the signalling objects to be carried by the commands in the transactions.

1. Circuit Assignment Map: Indicates the circuit assignment map as defined in ITU-T Q.763/§ 3.69.
2. Nx64K Type: Indicates whether or not the Nx64K service is contiguous or non-contiguous. See ITU-T Q. 763/§ 1.2 for a definition of contiguous or non-contiguous.
3. Nx64K Termination List: Is the list of termination which relate to N number of circuits required to realise the Nx64K service. These may be provided to or requested from the BIWF.

Nx64K CBC Capability Set

As per Q.1950/§ 6 with the following additions.

Required Standard Packages

The following package is to be used when using the Nx64K Service across the CBC interface:

H.248 Annex M.? Nx64K Circuit Package

CBC Procedures

As per Q.1950/§ 7.

CBC Procedures—Call Related

This section contains the Call Related procedures for the Nx64K Service when used in conjunction with Q.1950.

CSM Transactions

The following transaction is used to indicate that a procedure is to be initiated by the CSM. The transaction leads to commands being sent across the CBC interface.

TABLE B.1

Q.1950 - Call Related CSM originated Transactions on the CBC interface

| Transaction | Description |
| --- | --- |
| nx64K | This transaction is used to indicate to the BIWF that the nx64K service is used. This transaction provides to or requests from the BIWF information on whether or not the Nx64K type is contiguous or non-contiguous. It can also request the Circuit Assignment Map when the BIWF provides the terminations that are in use. |

When the transaction "Nx64K" is required the following procedure is initiated:

An ADD.req, MOD.req or MOV.req command (1) is sent with the following information.

(1) ADD.req/MOD.req/MOV.req ( . . . , Nx64K) CSM to BIWF (see Table 1 below)

Upon reception of the command (1), the BIWF shall:

Allocate circuits to the Nx64K service according to the Nx64K type, circuit assignment map and Nx64K termination List.

In the case where the CSF requests the Nx64K Type Non-contiguous and requests the BIWF to select the termination Ids, the BIWF shall send back the Circuit Assignment Map so that the CSF can associate the terminations in the multiplex in the correct manner.

In the case where the CSF requests the BIWF to choose the Nx64K Termination List it must provide N termination Ids (e.g. Tid1, Tid2, Tid?) in the Nx64K termination list.

Send the response to the requests in command (2).

Upon completion of processing command (1), an ADD.resp, MOD.resp or MOV.resp command (2) is sent.

(2) ADD.resp/MOD.resp/MOV.resp BIWF to CSM (see Table 2 below)

Formats and Codes

This section outlines the encoding of the Nx64K Service when used with the CBC protocol.

Formats & Codes—General

As per Q.1950/§ 11.1.

Formats & Codes—Commands

As per Q.1950/§ 11.2.

Formats & Codes—Signalling Objects

Table B.2/Q.1950—CBC Signalling Object to H.248 Coding Mapping Table (see Table 3 below)

(B) New H.248 Package for Defining the N*64K Service

This addition may be referred to as H.248 Annex M.? Nx64K Package. H.248 Annex M.? describes a package to enable the use of the Nx64K service in a split CSF and BIWF architecture. As defined in H.248, a "package" is an extension to H.248 that supports specific behaviour.

Scope

Package Name: Nx64K circuit package

PackageID: Nx64k, 0x00??

Package Description:

This package enables the use of the contiguous and non-contiguous Nx64K service. For a definition of the Nx64K procedures see ITU-T Q.764/§ 2.1.13. It defines a multiplex type for Nx64K, an indication of contiguous or non-contiguous and the ability to specify a Circuit Assignment Map.

Version: 1

Extends: None

Properties

Property Name: Nx64K Type

PropertyID: type, 0x0001

Description:

This property indicates whether or not the N×64K connection is contiguous or non-contiguous. See ITU-T Q.763/§ 1.2 for a definition of contiguous or non-contiguous.

Type: Enumeration
Possible Values:
Contiguous, [0x0001]
Non-Contiguous, [0x0002]
Defined in: Mux Descriptor
Characteristics: Read/Write
Property Name: Circuit Assignment Map
PropertyID: CAM, 0x0002
Description:

This property indicates the circuit assignment map as defined in ITU-T Q.763/§ 3.69.

Type: OCTET STRING
Possible Values:
Binary Encoding
The contents of the Circuit Assignment Map is coded as shown in ITU-T Q.763/§ 3.69
Text Encoding
The contents of the Circuit Assignment Map is coded as shown in ITU-T Q.763/§ 3.69 in the hexadecimal format indicated in H.248 B.3 Hexadecimal Octet Encoding. For example, the format of the circuit assignment map parameter field is shown in the following table.

|   | 8     | 7  | 6  | 5  | 4  | 3    | 2  | 1  |
|---|-------|----|----|----|----|------|----|----|
| 1 | spare |    |    |    |    | Map type | | |
| 2 | 8     | 7  | 6  | 5  | 4  | 3    | 2  | 1  |
| 3 | 16    | 15 | 14 | 13 | 12 | 11   | 10 | 9  |
| 4 | 24    | 23 | 22 | 21 | 20 | 19   | 18 | 17 |
| 5 | spare | 31 | 30 | 29 | 28 | 27   | 26 | 25 |

FIG. 1/H.248 Annex M.?—Circuit assignment map parameter field

Using Map Type 0 0 0 0 1 0 2048 kbit/s digital path map format (64 kbit/s base rate) and Circuit 1 and 4 being used the resultant text encoding would be:

02 09 00 00 00.

Defined in: Mux Descriptor
Characteristics: Read/Write
MUX Name
Mux Name: N×64K
MuxID: N×64K, 0x0001
Description:

This multiplex name indicates that the N×64K service is being used and that multiplexed terminations are being used. See ITU-T Q.764/§ 2.1.13 for the details of the N×64K procedures.

Procedures

A CSF may request the N×64K service by issuing the appropriate H.248 command with a multiplex descriptor indicating N×64K as the Mux Type. The CSF may also indicate to the BIWF whether Contiguous or Non-contiguous N×64K is used. The CSF may also request the BIWF to choose between Contiguous or Non-contiguous. For a definition of Contiguous and Non-contiguous see ITU-T Q.763/§ 1.2. The Circuit Assignment map parameter may also be requested from or given to the BIWF. For a definition of the use of the Circuit Assignment Map see ITU-T Q.763/§ 3.69. The multiplex descriptor requires that the CSF specifies terminations involved in the multiplex. The CSF may provide the Termination Identities associated with the Circuits involved in the N×64K service. The CSF may also request the Termination Identities associated with the Circuits involved in the N×64K service. In this case the CSF should issue a CHOOSE "?" for N terminations involved in the N×64K service.

EXAMPLE 1

The CSF wants to requests N×64K, non-contiguous for a 3×64K service and wants the BIWF to choose the Circuit Assignment Map.
Mux=Other {?, ?, ?, ?}, N×64K, N×64K/type=non-contiguous, N×64K/cam=?

EXAMPLE 2

The CSF wants to request N×64K contiguous for a 2×64K service and give the Circuit Assignment Map.
Mux=Other {A, B }, N×64K, N×64K/type=non-contiguous, N×64K/cam=02 09 00 00 00

(C) Additions to the H.248 Multiplex Descriptor

This contribution proposes additions to the H.248 Multiplex descriptor to allow for definition of multiplexes and associated properties using packages. This contribution proposes to add the ability of being able to:
Define the Multiplex Name in a package.
Define that a property occurs in the Multiplex Descriptor
It is proposed to make the following changes:

Multiplex Descriptor

In multimedia calls, a number of media streams are carried on a (possibly different) number of bearers. The multiplex descriptor associates the media and the bearers. The descriptor includes the multiplex type:
H.221
H.223,
H.226,
V.76,
Package Defined Multiplex Types (other),
Possible Extensions and a set of TerminationIDs representing the multiplexed inputs, in order, for example:
Mux=H.221{MyT3/1/2, MyT3/2/13, MyT3/3/6, MyT3/21/22}

The multiplex may also contain properties associated with the multiplex itself. These properties may also be defined in a package. Values of properties may be underspecified.

A new setting of the MuxDescriptor completely replaces the previous setting of that descriptor in the MG. Thus to retain information from the previous setting the MGC must include that information in the new setting. If the MGC wishes to delete some information from the existing descriptor, it merely resends the descriptor (in a Modify command) with the unwanted information stripped out.

Properties

Properties defined by the package, specifying:
Property Name: only descriptive.
PropertyID: Is an identifier
. . .
Defined in:
The properties are defined in the given H.248 descriptors. LocalControl is for stream dependent properties. TerminationState is for stream independent properties. ContextAttribute is for properties which affect the context as a whole ie. mixing properties. MuxDescriptor is for properties which affect the characteristics of a Multiplex. These are expected to be the most common cases, but it is possible for properties to be defined in other descriptors. Context properties MUST be defined in the ContextAttribute descriptor.

Mux Type
   Mux Name: only a descriptive name
   MuxID: Is an identifier of the multiplex
   Description:
   This describes the type of multiplex.
   H.248 Annex A ASN.1 Syntax Specification

```
MuxDescriptor   ::= SEQUENCE
{
    muxType         MuxType,
    termList        SEQUENCE OF TerminationID,
    nonStandardData NonStandardData OPTIONAL,
    ...,
    muxOther        PkgdName,
    muxParameter    SEQUENCE OF PropertyParm OPTIONAL
}
MuxType ::= ENUMERATED
{
    h221(0),
    h223(1),
    h226(2),
    v76(3),
    ...,
    other(4),
}
```

H.248 Annex B ABNF Syntax Specification

```
muxDescriptor  = MuxToken EQUAL MuxType terminationIDList
       [pkgdName / LBRKT propertyParm *(COMMA
       propertyParm) RBRKT]
MuxType        = (H221Token / H223Token / H226Token / V76Token
       / extensionParameter / other)
```

It will be appreciated by the person of skill in the art that various modifications may be made to the above described embodiments without departing from the scope of the present invention.

TABLE 3

| CBC Signalling Object | H.248 Descriptor | H.248 Coding |
| --- | --- | --- |
| CAM | Local Control | As defined in Package/Property in H.248 Annex M.?/§ M.?.6.1.2. |
| Nx64K Type | Mux Descriptor | As defined in Package/Property in H.248 Annex M.?/§ M.?.6.1.1 and M.?.6.5 according to the procedures in H.248/§ 7.1.3 and H.248 Annex M.?/§ 6.6. |
| Nx64K Termination ID List = (Tid1..TidN) | Mux Descriptor | As defined in H.248/§Annex A and B MuxDescriptor Termination ID list according to H.248/§ 7.1.3. N shall be the number of terminations in the list. |

The invention claimed is:

1. In a telecommunications network, a method of controlling a media gateway to handle a multiplex session, using a media gateway controller, the media gateway and the media gateway controller communicating using an interface protocol providing for command messages having a structure including a context field for identifying a context of the media gateway, a termination field for identifying one or more terminations of the media gateway involved in said context, at least one descriptor for defining properties of the context, and a package identifier, the method comprising the steps of:

at the media gateway controller, generating a command message having said structure and containing a multiplex descriptor including a package identifier, the package identifier identifying a package implemented at the media gateway for handling a multiplex session, wherein a service or functionality associated with the package is invoked by the media gateway controller by including the package identifier in the command message;

sending the generated command message from the media gateway controller to the media gateway; and

TABLE 1

| Address Information | Control information | Bearer information |
| --- | --- | --- |
|  | As per flow (1) Q.1950/§ 8.1.1 Prepare_BNC_Notify or 8.1.2 Establish_BNC_Notify Nx64K Termination List = ?/(Tid1..TidN) | As per flow (1) Q.1950/§ 8.1.1 Prepare_BNC_Notify or 8.1.2 Establish_BNC_Notify With the following additions: Nx64K Type = ?/Contiguous/ Non-contiguous/ If Nx64K Termination List = ? & Nx64K Type = Non-Contiguous Circuit Assignment Map = ? |

TABLE 2

| Address Information | Control information | Bearer information |
| --- | --- | --- |
| If requested: T-BIWF-Adress = X | As per flow (2) Q.1950/§ 8.1.1 Prepare_BNC_Notify or 8.1.2 Establish_BNC_Notify If requested: Nx64K Termination List = (Tid1..TidN) | As per flow (2) Q.1950/§ 8.1.1 Prepare_BNC_Notify or 8.1.2 Establish_BNC_Notify With the following additions: Nx64K Type = Contiguous/ Non-contiguous/ Circuit Assignment Map = XX | at the media gateway, establishing the context identified in the message according to the specified package.

2. A method according to claim 1, wherein the multiplex descriptor includes at least one property of the package identified in the descriptor, and the context is established according to the package and the at least one property.

3. A method according to claim 1, wherein said at least one property included in the command message includes a circuit assignment map; or contiguous or non-contiguous service type.

4. A method according to claim 1, wherein said interface protocol is H.248.

5. A method according to claim 1, wherein said multiplex session is of an N*64K type, and an N*64K type session is identified by the package identifier and is established as a result of implementing said package in the Media Gateway.

6. A media gateway controller arranged in use to control a media gateway using an interface protocol providing for command messages having a structure including a context field for identifying a context of the media gateway to which the message relates, a termination field for identifying one or more terminations of the media gateway involved in said context, at least one descriptor for defining properties of the context, and a package identity, the media gateway controller comprising:
- processing means for generating a command message having said structure and containing a multiplex descriptor including a package identifier, the package identifier identifying a package implemented at a media gateway for handling a multiplex session, wherein a service or functionality associated with the package is invoked by the media gateway controller by including the package identifier in the command message;
- input/output means for coupling to input/output means of a media gateway; and
- transmission means for sending the generated command message from the media gateway controller to a media gateway via the input/output means of the media gateway controller.

7. The media gateway controller according to claim 6, wherein the multiplex descriptor of said command message includes at least one property of the identified package.

8. The media gateway controller according to claim 6, wherein said interface protocol is H.248.

9. A media gateway arranged in use to be controlled by a media gateway controller using an interface protocol providing for command messages having a structure including a context field for identifying a context of the media gateway to which the message relates, a termination field for identifying one or more terminations of the media gateway involved in said context, at least one descriptor for defining properties of the context, and a package identity, wherein a service or functionality associated with a package is invoked by the media gateway controller by including the package identifier in the command message, the media gateway comprising:
- processing and memory means for implementing at least one package;
- input/output means for coupling to input/output means of a media gateway controller; and
- receiving means coupled to said input/output means of the media gateway for receiving a command message having said structure and containing a multiplex descriptor including a package identifier, the package identifier identifying a package implemented at a media gateway for handling a multiplex session, and for causing said processing and memory means to implement the identified package.

10. A media gateway according to claim 9, wherein the multiplex descriptor of said command message includes at least one property of the identified package.

11. A media gateway according to claim 9, wherein said interface protocol is H.248.

12. In a telecommunications network, a method of controlling a media gateway to handle a multiplex session, using a media gateway controller, the media gateway and the media gateway controller communicating using the H.248 standardised interface protocol providing for command messages having a structure including a context field for identifying a context of the media gateway, a termination field for identifying one or more terminations of the media gateway, and at least one descriptor for defining properties of the context, the method comprising the steps of:
- at the media gateway controller, generating a command message having a multiplex descriptor including a static enumerator type N*64K for implementing a N*64K package, wherein a service or functionality associated with the package is invoked by the media gateway controller by including the multiplex descriptor in the command message;
- sending the generated command message from the media gateway controller to the media gateway; and
- at the media gateway, responding to receipt of said message by implementing the N*64K package to create or modify a context.

13. The method of claim 12 wherein said interface protocol is H.248.

* * * * *